United States Patent [19]

Herb et al.

[11] 4,147,444
[45] Apr. 3, 1979

[54] EXPANSION DOWEL

[75] Inventors: Armin Herb, Peissenberg; Erwin Schiefer, Munich, both of Fed. Rep. of Germany

[73] Assignee: Hilti Aktiengesellschaft, Schaan, Liechtenstein

[21] Appl. No.: 860,181

[22] Filed: Dec. 13, 1977

[30] Foreign Application Priority Data

Dec. 17, 1976 [DE] Fed. Rep. of Germany ....... 2657353

[51] Int. Cl.² .......................... F16B 2/04; F16B 13/12
[52] U.S. Cl. .................................. 403/313; 403/297; 403/344; 403/406; 52/585; 85/85; 405/259
[58] Field of Search .................. 403/292, 2, 295, 297, 403/290, 277, 281, 344, 313, 405, 406, 409; 52/585; 61/45 B; 85/84, 85

[56] References Cited
U.S. PATENT DOCUMENTS

| 3,157,417 | 11/1964 | Ruskin ...................................... 403/2 |
| 3,313,199 | 4/1967 | Houvener et al. ............... 403/297 X |
| 3,461,772 | 8/1969 | Barry ..................................... 85/84X |
| 3,996,835 | 12/1976 | Chromy ............................. 85/84 X |

FOREIGN PATENT DOCUMENTS 213739  3/1958 Australia ..................................... 85/84

*Primary Examiner*—Wayne L. Shedd
*Attorney, Agent, or Firm*—Toren, McGeady and Stanger

[57] ABSTRACT

An expansion dowel includes a cylindrically shaped axially extending sleeve and a spreader for expanding the sleeve. The sleeve has a leading end and a trailing end and at least one axially extending slot formed in the sleeve. For at least a portion of its length, the slot has oppositely arranged sides converging in the direction of the leading end of the sleeve. The spreader fits into the part of the slot with the converging sides and has complementary converging sides to those in the slot. The spreader includes an impact piece against which impact force can be applied for axially displacing the spreader through the slot and expanding the sleeve.

9 Claims, 3 Drawing Figures

EXPANSION DOWEL

SUMMARY OF THE INVENTION

The present invention is directed to an expansion dowel formed of an expansion sleeve and a spreader or expanding member and, more particularly, the sleeve includes at least one longitudinally extending slot through which the spreader can be displaced in the axial direction of the dowel for expanding the sleeve.

Known expansion dowels include a cylindrically shaped sleeve slotted over its entire length. A spreader having a wedge-shaped nose extends through the sleeve and projects into the slot which is parallel to the axis of the dowel. The wedge-shaped end of the spreader widens or diverges in the direction toward the leading end of the dowel. When the expansion dowel is set in place, blows are applied against the sleeve driving it over the wedge-shaped portion of the spreader so that the sleeve is expanded in the radial direction. Since the leading end of the dowel may be substantially larger than its trailing portions because of the spreading action, it often happens that the sleeve cannot be driven along its entire length. To achieve post-spreading, the object to be anchored must be attached to the spreader. Such a construction is disadvantageous because male and female threads cannot be used. In applying a load to the sleeve there is the possibility that the sleeve may be removed from its borehole together with the spreader, since no post-spreading is effected.

The primary object of the present invention is to provide an expansion dowel which is simple to produce and permits post-spreading when load is applied.

In accordance with the present invention, the expansion dowel consists of an axially extending, cylindrically shaped sleeve and a spreader. The sleeve contains an axially extending slot with at least a portion of the slot having sides which converge toward the leading end of the sleeve. The spreader fits into the converging portion of the slot and it has converging sides complementary to the sides in the slot. Since a portion of the slot and of the spreader both have converging sides of a wedge-shaped arrangement, an almost cylindrical spreading of the expansion sleeve is possible. Accordingly, a uniform distribution of the expansion pressure in the borehole is effected.

To achieve post-spreading of the sleeve when a load is applied to the dowel, it is advantageous if the converging sides of the slot also converge radially inwardly, that is, so that the slot narrows toward the axis of the sleeve. With the sides of the slot also converging in the radially inward direction, when a spreading force is applied a radially directed component of the force is developed against the spreader. This force component causes the spreader to be pressed outwardly against the wall of the borehole. Due to the friction at the wall of the borehole, the spreader remains in the axial direction when a load is applied to the sleeve. Further, when the load is applied to the dowel, the spreader moves relative to the sleeve toward its leading end for effecting a further expansion of the sleeve.

For uniform distribution of the expanding pressure, it is advantageous for the spreader to have an arcuately shaped radially outer surface corresponding essentially to the radially outer surface of the sleeve. As a result, a large area on the spreader contacts the wall of the borehole. If the contact surface is sufficiently large, the dowel can also be used for light structural materials, since the spreading pressure will be small.

After the dowel is inserted into a borehole, its expansion is effected by driving the spreader toward the leading end of the sleeve. To eliminate the need for any special tools for axially displacing the spreader, it is advantageous if an impact piece, projecting outwardly from the trailing end of the sleeve, is formed integrally with the spreader. With such a construction, the spreader may be driven by means of a simple hammer. The impact piece projecting beyond the trailing end of the sleeve can also be used as an indicator of the extent to which the dowel has been set. Advantageously, the dowel is constructed so that the spreader when driven into the sleeve is flush with the sleeve.

Very often it is necessary to provide the trailing end of the sleeve with holding means, such as male or female threads. In such expansion dowels, it is advantageous if the spreader has an impact piece located within the interior of the sleeve, forwardly of its trailing end. Such an impact piece can be formed as an integral bent lug on the rearward end of the spreader. Other arrangements are also possible, such as cam surfaces and the like. To drive such a spreader, a rod-shaped setting tool is inserted into the sleeve against the impact piece and the tool can have a cross-sectional shape corresponding to the opening through the sleeve.

To prevent any excessive spreading of the dowel, it is advantageous if the impact piece is attached to the spreader at a predetermined breaking point. As the dowel is set, the increasing driving friction developed eventually reaches a predetermined anchoring pressure. Such anchoring pressure can be noted when the impact piece shears off from the spreader at the predetermined breaking point. The predetermined breaking point may be in the form of a groove in the spreader at the point of attachment of the impact piece. In most cases, however, the predetermined breaking point can be formed by a substantial transition in the cross-sectional area between the spreader and its impact piece. After the impact piece has been sheared off it is no longer possible to drive the spreader.

For a simple expansion dowel construction in which uniform distribution of the expanding forces can be effected, it is advantageous if the sleeve is formed with a pair of diametrically opposed slots each having converging sides and with a spreader in each of the slots. The two spreaders are interconnected by an impact piece. Such a dowel can be formed by folding a sheet metal strip over upon itself. In such an arrangement, the two spreaders are interconnected by a deformable bight section. The deformable bight section facilitates the contact of the spreaders with the wall of the borehole even after the sleeve has been expanded. The combined spreaders and bight section can be formed of a stamped part corresponding to the formation of the sleeve.

The trailing end of the sleeve can have the shape of a pipe, flange or loop and can include holding means, such as male or female threads, cross bores and the like.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
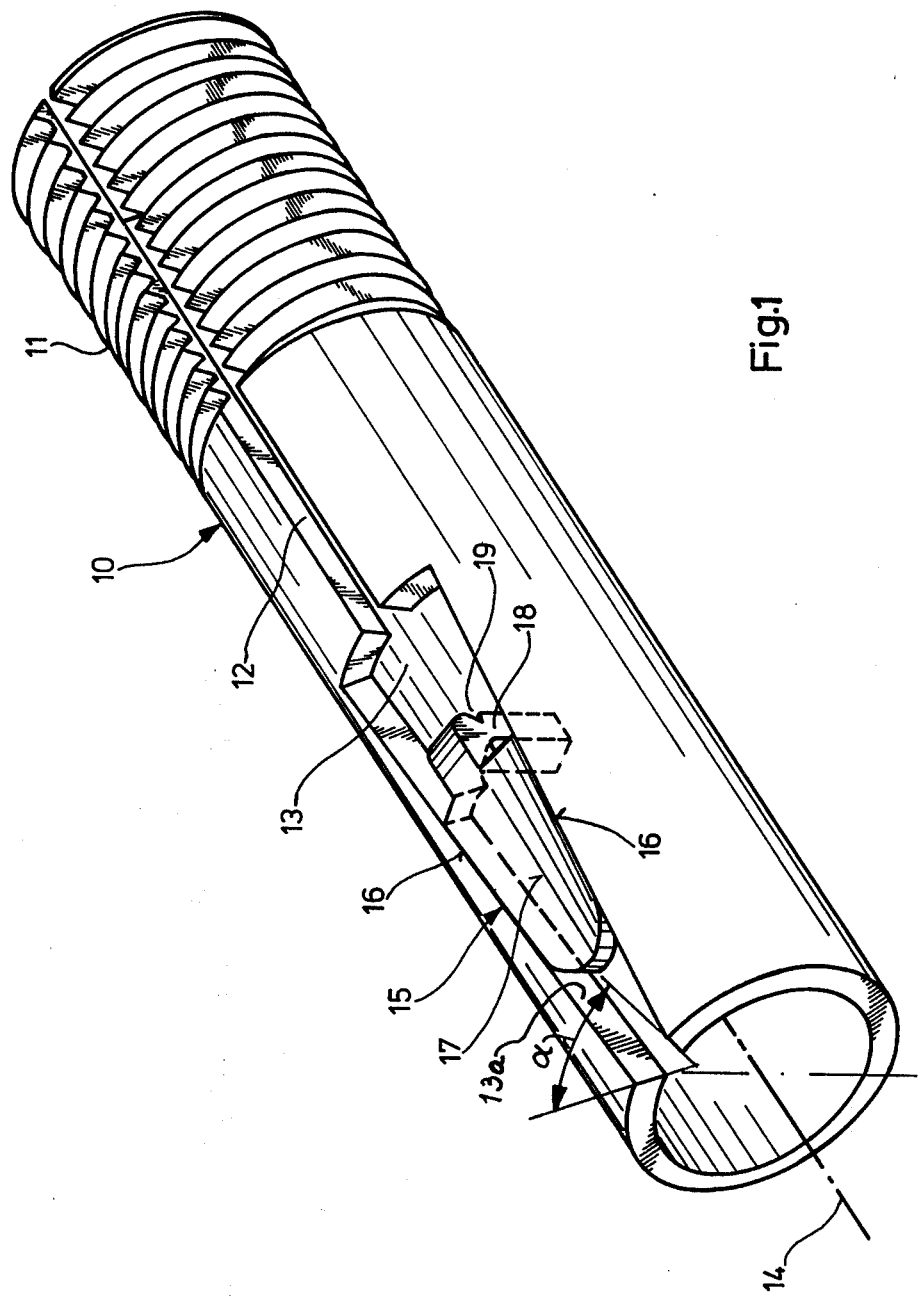
FIG. 1 is a perspective view of one embodiment of an expansion dowel formed according to the present invention.

In FIG. 1 an expansion dowel is displayed consisting of a cylindrically shaped axially extending sleeve 10 and a spreader or expanding member 15. The sleeve has a leading end, that is its left-hand end in FIG. 1, which is inserted first into a borehole, and a trailing end. The outer surface of the sleeve at its trailing end has a male thread 11. In addition, an axially extending slot 12 is formed through the sleeve from its leading end to its trailing end. In the forward portion of the sleeve, forwardly of the thread 11, the slot 12 has a pair of opposite sides 13a disposed in converging relationship toward the leading end of the sleeve and forming a recess 13. The spreader 15 has a pair of sides or flanks 16 which are complementary to the sides 13a of the slot and are in contact with such sides. The sides 16 afford a wedge-shaped arrangement of the spreader 15. At its trailing end, that is the end closer to the trailing end of the dowel, the spreader 15 has an impact piece 18 formed integrally with it and extending radially inwardly into the interior of the sleeve. Most of the impact piece 18 as shown in FIG. 1 is indicated in phantom. The impact piece 18 is in the form of a bent lug. At the point of connection between the spreader 15 and the impact piece 18 is a groove-shaped predetermined breaking or shearing point 19. When the dowel is inserted into a borehole, the spreader is driven toward the leading end of the sleeve 10 by means of a rod-shaped placement tool. When the forces displacing the spreader axially through the slot 12 exceed a predetermined anchoring strength, the predetermined breaking point is reached and any further force applied to the impact piece 18 will cause it to be sheared off from the spreader. Accordingly, overspreading of the dowel is not possible. As can be seen best by viewing the leading end of the sleeve 10, the sides 13a of the recess 13 converge inwardly relative to one another toward the axis 14 of the sleeve. Preferably, the angle α is between 60° and 120°. Due to this configuration of the sides 13a of the recess 13 in the slot, a force component in the radial direction is created against the spreader 15. This force component causes the spreader 15 to be pressed radially outwardly against the wall of the borehole into which the dowel is being anchored. To afford a uniform distribution of the expanding pressure in the borehole, the spreader 15 has a radially outer surface 17 which is arcuately shaped conforming essentially to the contour of the outer circumferential surface of the sleeve 10. While a male thread 11 has been shown adjacent the trailing end of the sleeve 10, it could also be provided with a female thread or other means for mounting an object to be secured by the dowel.

Figure 2:
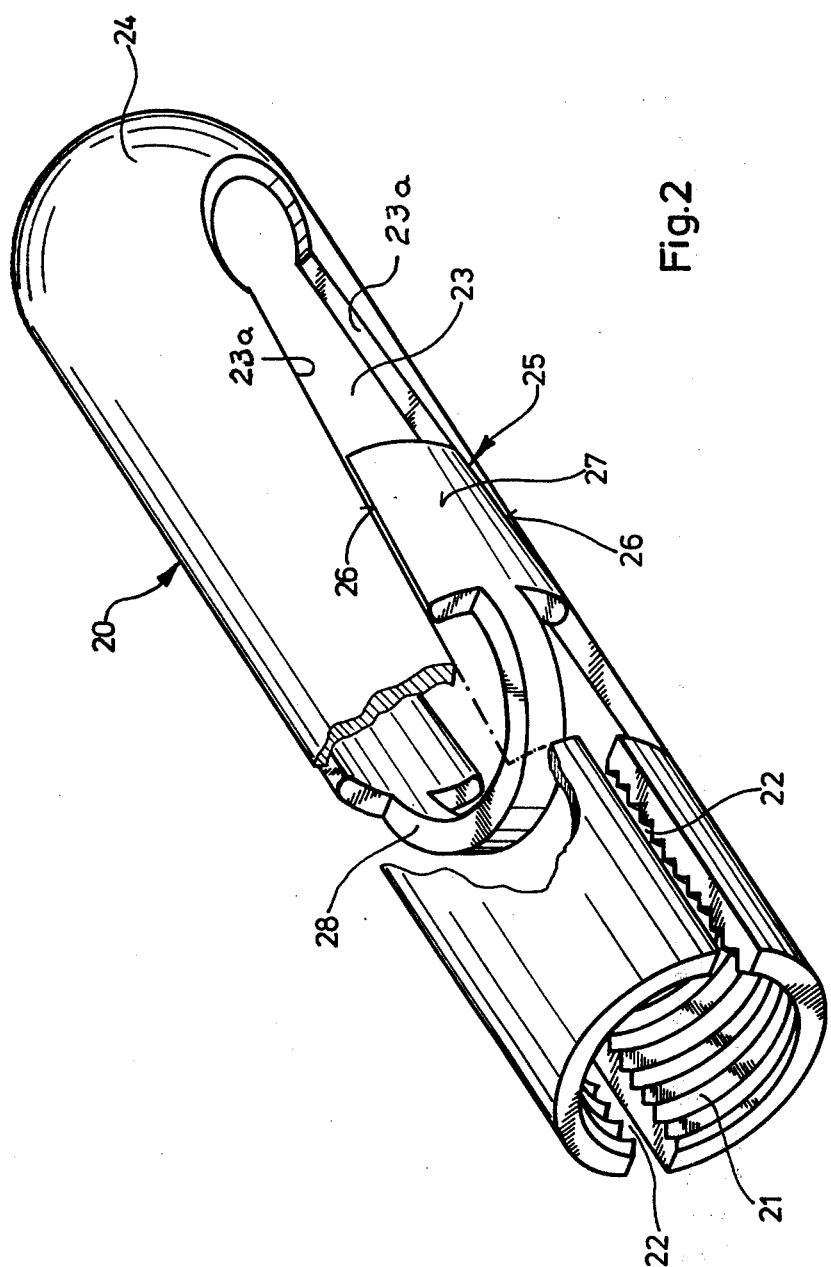
FIG. 2 is a perspective view of another expansion dowel embodying the present invention and including two spreaders positioned diametrically opposite to one another.

In FIG. 2 another expansion dowel is illustrated embodying the present invention and consisting of an expansion sleeve 20 and a spreader or expanding member 25. The sleeve 20 is formed by folding a shaped sheet-metal strip over upon itself. In other words, both ends of the strip extending from its mid-point are similarly shaped. Accordingly, when the strip is folded over, the leading end 24 of the sleeve is closed so that any material left in the borehole can be, at least partially prevented from entering the sleeve 20. At its trailing end, the sleeve is provided with a female thread 21. When the shaped sheet-metal strip is folded over upon itself to form the sleeve, two axially extending slots 22 are formed in diametrically opposite sides of the sleeve. These slots 22 extend for approximately the full length of the sleeve to the closed leading end 24. In the portion of the slots 22 closer to the leading end 24 of the sleeve 20, sides 23a of the slot, converging toward the leading end of the sleeve, define a recess 23. A spreader 25 is located in each of the recesses 23 and has complementarily converging flanks 26 in surface contact with the similarly shaped sides 23a of the recess 23. The sides 26 of the spreader are wedge-shaped. Further, the radially outer surfaces 27 of the spreaders 25 are arcuately shaped transversely of the axial direction of the dowel and have a contour corresponding to the circumferentially extending surface of the sleeve 20. The two spreaders 25, one in each of the recesses 23 in the slots 22, are arranged diametrically opposite one another and are connected by a bight portion impact piece 28. The combination of the two spreaders 25 and the impact piece 28 is generally U-shaped with the bight portion impact piece 28 interconnecting the trailing ends of the two spreaders 25. The impact piece 28 is rounded and extends away from the leading end of the sleeve and is dimensioned so that it will be deformed or broken when a certain driving friction is reached as the spreaders 25 move toward the leading end of the sleeve, accordingly, overspreading of the dowel is avoided. In place of the female thread 21 formed on the interior of the sleeve adjacent its trailing end, other means for securing an object to the dowel could be used, for example, a bore extending perpendicularly to the axis of the dowel could be formed in the sleeve or it could be provided with a radially projecting holding rim. In a dowel having an impact piece 28 which projects outwardly from the trailing end of the sleeve 20, the anchored dowel can be removed from a borehole by simply withdrawing the spreader. In such an arrangement, the recesses 23 formed in the slots 22 would reach the trailing end of the sleeve 20. To avoid any erosion of the spreader 25 in the sleeve 20, it has proven to be advantageous to round-off the sides 26 of the spreader as viewed transversely of the axial direction of the sleeve. With this arrangement, end pressures interfering with the function of the dowel cannot occur.

Figure 3:
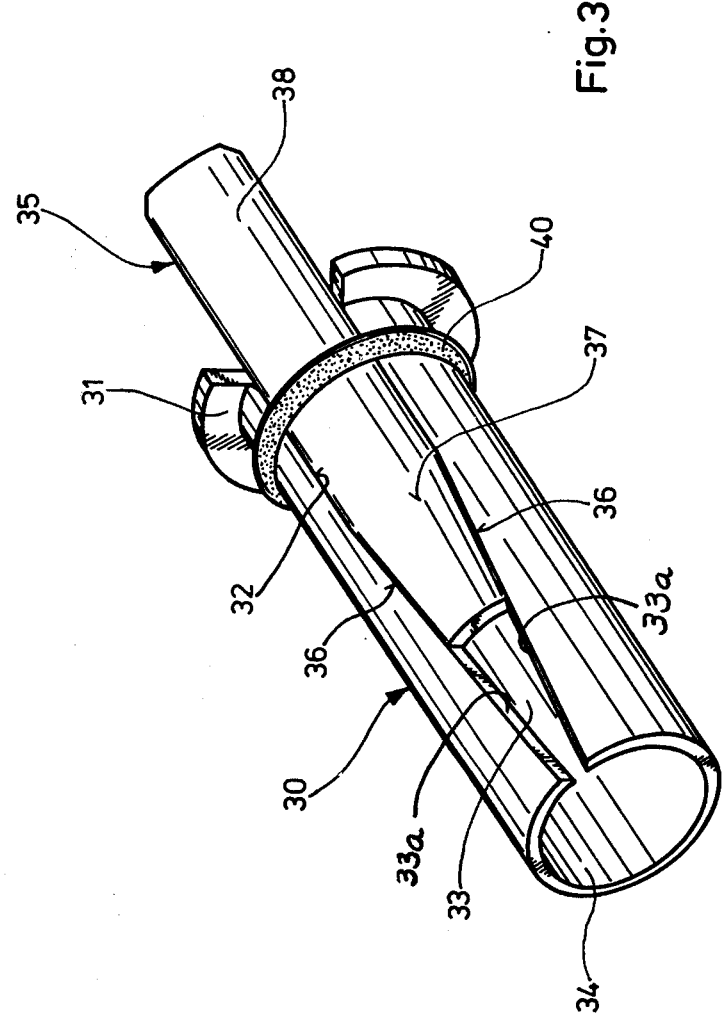
FIG. 3 is a perspective view of still another expansion dowel incorporating the present invention with its spreader projecting rearwardly from the trailing end of the dowel sleeve.

In FIG. 3, still another embodiment of the present invention is illustrated in which the expansion dowel consists of an expansion sleeve 30 and a spreader 35. The trailing end of the sleeve, that is, its right-hand end as viewed in FIG. 3, has a radially outwardly extending flange 31 and a slot 32 extends from the trailing end to the leading end of the sleeve. From the leading end of the sleeve a portion or recess 33 of the slot has the sides 33a in converging relation toward the leading end. The spreader 35 extends through the slot from the trailing end of the sleeve into the recess 33. Within the recess 33 the spreader 35 has converging sides 36 in contact with the sides 33a of the recess. The sides 36 are wedge-shaped corresponding to the arrangement of the sides 33a. The radially outer surface 37 of the spreader which contacts the wall of the borehole when the dowel is anchored, is arcuately shaped corresponding to the arcuate circumferential surface of the sleeve. The end of the spreader 35 extending outwardly from the trailing end of the sleeve forms an impact piece 38. After the expansion dowel is placed within a borehole, the spreader 35 is driven forwardly through the slot 32 by applying a force to the impact piece 38. As the spreader 35 moves toward the leading end of the sleeve, the sleeve is spread or expanded radially into contact with the surface of the borehole. The flange 31 serves as a stop against the surface of the material into which the borehole is formed. When the depth of the borehole is in accordance with the length of the sleeve, the flange may be omitted. Preferably, an elastic ring 40 is slipped over the dowel sleeve for securing the spreader 35 in position during handling of the dowel. Instead of the ring 40, however, the spreader 35 can be held in position by other means, for example, glue, adhesive tape or spot welding.

While specific embodiments of the invention have been shown and described in detail to illustrate the application of the inventive principles, it will be understood that the invention may be embodied otherwise without departing from such principles.

What is claimed is:

1. An expansion dowel comprising an axially extending cylindrically shaped expansion sleeve having at least one axially extending slot therein, said sleeve having a leading end and a trailing end and a radially outer surface and a radially inner surface with the interior of said sleeve inwardly of said inner surface forming an open space, and a spreader extending in the axial direction of said sleeve and positioned in said slot for expanding said sleeve, said spreader having a first end closer to the leading end of said sleeve and a second end spaced in the direction of the trailing end of said sleeve from the first end, wherein the improvement comprises that said axially extending slot has a pair of axially extending spaced first sides with said sides being in converging relation toward the leading end of said sleeve for a least a portion of the length of said slot, said spreader having a pair of axially extending second sides disposed in converging relation toward the first end of said spreader for at least a portion of the axial length of said spreader and said second sides of said spreader being in surface contact with said first sides of said slot, and an impact piece is secured to said spreader adjacent the second end thereof and spaced from the first end thereof and said impact piece extends transversely of the axial direction of said sleeve inwardly from said spreader into the open space within said sleeve.

2. An expansion dowel, as set forth in claim 1, wherein a predetermined breaking point is formed at the interconnection of said impact piece and said spreader.

3. An expansion dowel, according to claim 1, wherein said sleeve has a pair of said slots disposed diametrically opposite one another, a pair of said spreaders each disposed in a different one of said slots and said impact piece interconnecting said spreaders and located within said sleeve spaced from the trailing end thereof.

4. An expansion dowel, as set forth in claim 1, wherein said first sides of said slot extending from the leading end toward the trailing end of said sleeve and terminating intermediate the leading and trailing ends and the remainder of said slot to the trailing end of said sleeve comprising a pair of third sides disposed in parallel relation.

5. An expansion dowel, as set forth in claim 1, wherein said sleeve comprises a shaped sheet-metal strip having a first end and an oppositely positioned second end, said strip being bent over upon itself so that its first and second ends form the trailing end of said sleeve and said leading end of said sleeve is formed by a portion of said strip intermediate the first and second ends thereof and said portion of said strip forming a closed leading end for said sleeve.

6. An expansion dowel, as set forth in claim 1, wherein said sleeve has a radially outwardly extending flange at the trailing end thereof and means located adjacent the trailing end of said sleeve for retaining said spreader in said slot prior to the spreading operation.

7. An expansion dowel, as set forth in claim 5, wherein the second sides on said spreader are rounded in the direction transverse to the axial direction of said sleeve.

8. An expansion dowel, as set forth in claim 1, wherein said impact piece is formed integrally with said spreader.

9. An expansion dowel, as set forth in claim 1, wherein the radially extending surfaces of said first sides of said slot converge inwardly toward one another from the radially outer surface to the radially inner surface of said sleeve, the radially outer surface of said sleeve is arcuately shaped in the circumferential direction thereof, and said spreader has a radially outer surface and a radially inner surface relative to the axis of said expansion sleeve and said radially outer surface of said spreader is arcuately shaped corresponding to the contour of the circumferentially extending radially outer surface of said sleeve.

* * * * *